United States Patent [19]

Lutzens

[11] Patent Number: 4,514,905
[45] Date of Patent: May 7, 1985

[54] CONVERGENCE EXTENSOMETER FOR MEASURING MINE ROOF SUBSIDENCE

[75] Inventor: William W. Lutzens, Parachute, Colo.

[73] Assignee: Union Oil Company of California, Los Angeles, Calif.

[21] Appl. No.: 535,428

[22] Filed: Sep. 26, 1983

[51] Int. Cl.³ .......................... G01B 5/30; G08B 21/00
[52] U.S. Cl. .................................. 33/125 B; 33/1 H; 33/143 R; 73/784
[58] Field of Search .................. 33/1 H, 1 LE, 125 B, 33/143 R, 143 G, 147 D, 147 K, 161; 73/784

[56] References Cited

U.S. PATENT DOCUMENTS

| | | | |
|---|---|---|---|
| 728,763 | 5/1903 | Ritsch | 33/143 G |
| 3,092,912 | 6/1963 | Reed | 33/147 D |
| 3,594,773 | 7/1971 | Conkle | 73/784 |
| 3,680,214 | 8/1972 | Quenot | 33/161 |
| 4,070,906 | 1/1978 | Rupert et al. | 33/125 B |
| 4,271,407 | 6/1981 | Kehrman et al. | 73/784 |
| 4,426,642 | 1/1984 | Poffenbarger | 73/784 |

FOREIGN PATENT DOCUMENTS

| | | | |
|---|---|---|---|
| 1200500 | 12/1959 | France | 33/161 |
| 11916 | of 1915 | United Kingdom | 73/784 |
| 723128 | 3/1980 | U.S.S.R. | 33/125 B |

Primary Examiner—Richard R. Stearns
Attorney, Agent, or Firm—Robert J. Baran; Gregory F. Wirzbicki; Dean Sandford

[57] ABSTRACT

An extensometer for measuring changes in the vertical distance between the roof and floor of a mine opening which comprises; a pair of rigid telescoping members, a tension spring securing said members to each other in a telescoping relationship, a hook for attaching a non-extensible cable to each of said members, and an indicator for determining telescopic movement of said members. The extensometer of this invention is utilized by securing one of said telescoping members to the roof of the mine and the other telescoping member to the floor of the mine with the axis of said members being disposed along the vertical. The telescoping members are secured, under tension, to the mine roof and floor by means of a non-extendible cable such as a steel cable. The indicator for determining the telescopic movement of the members may be a pair of lugs or flanges or other indicating marks, each member of which pair is affixed to a separate telescoping member.

11 Claims, 1 Drawing Figure

U.S. Patent    May 7, 1985    4,514,905
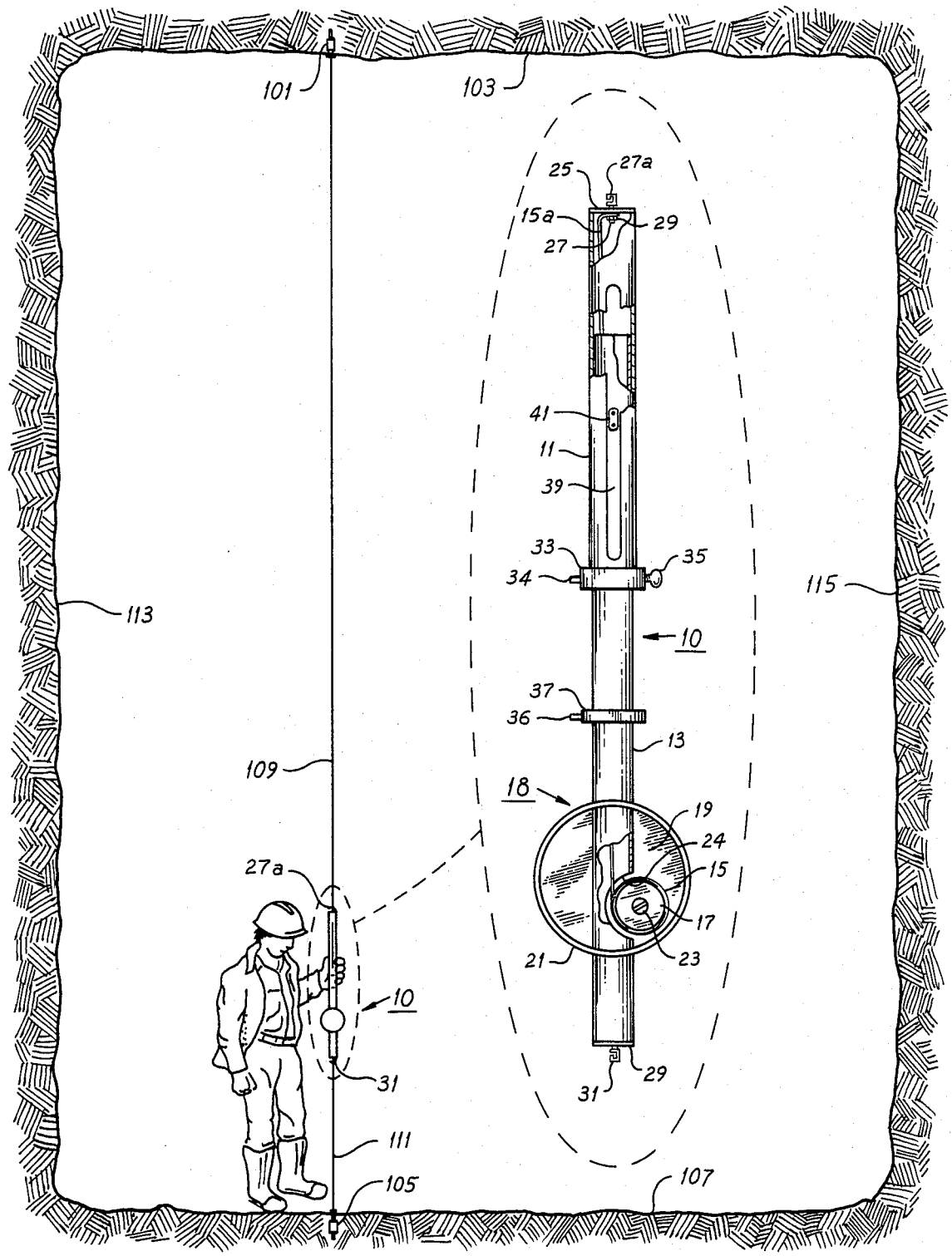

4,514,905

CONVERGENCE EXTENSOMETER FOR MEASURING MINE ROOF SUBSIDENCE

BACKGROUND OF THE INVENTION

1. Field of the Invention

The instant invention relates to a device for measuring changes in the vertical distance between the roof and floor of a mine.

2. Background of the Prior Art

Many devices have been utilized to measure the distance between the floor and the roof of a mine for the purpose of determining whether the roof is subsiding.

U.S. Pat. No. 3,092,912, for example, discloses a tape extensometer for measuring roof subsidence. This device includes a variable length roof tape which is secured at one end to a reel and the other end to the mine roof. A floor tape has one end secured to the mine floor and the other end passes over a pulley which is rigidly connected to the roof tape reel and is anchored by a counter weight. This device enables one to determine changes in the vertical distance as the counter weight which anchors the floor tape over the pulley moves. This device requires the user to attach the tape to the mine roof each time he wishes to make a measurement. This is impractical when the mine roof is very high.

U.S. Pat. No. 1,427,773 discloses a deflection indicator for measuring the deflection of beams and floors under loads This device relies on vertically installed poles or bars which move past each other to indicate movement of the floor and/or the roof. The requirement of a rigid pole or bar would make this device less than useful in a mine environment. For example, since the distance between the floor and the roof of a mine may be 60 feet or more, spanning this length with poles or bars would be difficult and moreover the use of poles or bars of this length would make the device more expensive than need be.

Other references which disclose the use of extensometers include U.S. Pat. Nos. 3,646,553; 3,885,423 and 4,001,942. These references disclose extensometers which are anchored directly in the mine wall or roof. Thus, the movement measured by the individual extensometers is movement of the surface relative to the under or overlying bulk of the mine floor or roof.

Other devices are known which may be used for measuring linear distances which utilize gages that may be separated from the work that is being measured and reinstalled at a later date to determine any change in the measured distances. See for example, U.S. Pat. No. 2,445,340. In a mine the measurement of changes in linear distance is not important for predicting roof collapse.

One reference which utilizes telescoping cylindrical members to indicate earth movement is found in U.S. Pat. No. 3,786,503. This reference, like the deflection indicator described above discloses a device which requires that the device itself be sized to engage both the roof and floor of a mine hole. For this reason, this device would not be suitable for use in mines having a vertical distance between the floor and roof of up to 60 feet or more. Moreover, the device described in U.S. Pat. No. 3,786,503 is intended to electrically signal only when the roof has subsided a predetermined distance along the vertical. There is no indication that this device might be used to measure subsidence on a continuous basis.

It is clear from the above that it would be desirable to have a relatively simple device which is capable of measuring the changes in the vertical distance between the roof and the floor of a mine with sufficient accuracy to enable a mine engineer to determine whether there is danger of roof collapse.

Therefore, it is one object of this invention to provide a device which can be easily installed in a mine to measure the change in the vertical distance between the mine floor and the roof.

It is another object of this invention to provide a device which is portable and can be moved between various points to measure the change in the vertical distance between the floor and roof of a mine.

Furthermore, it is another object of this invention to provide a device which can be installed in place with a minimum effort.

It is another object of this invention to provide a device which is compact and can be utilized in conjunction with easily obtained materials such as anchor bolts, steel cable, etc. to measure the subsidence of the roof of a mine.

Other objects and advantages of the instant invention will become apparent from a careful reading of the specification below.

SUMMARY OF THE INVENTION

The instant invention provides an extensometer for measuring changes in the vertical distance between the roof and floor of a mine opening which comprises a pair of rigid telescoping members, a tension spring securing said members to each other in a telescoping relationship, a hook for attaching a non-extensible cable to each of said members, and an indicator for determining telescopic movement of said members.

The extensometer of this invention is utilized by securing one of said telescoping members to the roof of the mine and the other member to the floor of the mine with the axis of said members being disposed along the vertical. The telescoping members are secured, under tension, to the mine roof and floor by means of a non-extendible cable such as a steel cable. The indicator for determining the telescopic movement of the members may be a pair of lugs or flanges or other indicating means, each member of which pair is affixed to a separate telescoping member.

BRIEF DESCRIPTION OF THE DRAWING FIGURES

The invention will be more readily understood by reference to the drawing figure wherein:

The FIGURE is a fragmentary elevational view of a preferred embodiment of the extensometer of this invention and includes a schematic diagram showing the above preferred embodiment installed in a mine for the purpose of measuring changes in the vertical distance between the mine roof and the mine floor.

DETAILED DESCRIPTION OF THE INVENTION

Referring now to the Figure of the drawing, a preferred embodiment of the extensometer of the instant invention designated generally at 10 comprises a first or upper hollow cylindrical member 11 having an inner diameter slightly greater than the outside diameter of a second or lower hollow cylindrical member 13. As shown, hollow cylindrical members 11 and 13 are in telescoping relationship with a portion of the lower member 13 inserted into the upper member 11. Said upper and lower members are maintained in a telescoping relationship through a coil spring 15 which is secured to both hollow cylindrical members. The coil spring 15 is preferably a constant tension spring so that repeatable measurements are possible. Coil spring 15 is coiled around pulley 17 which is secured to spring housing 18. Spring housing 18 includes a circular plate 19, an opposite plate (not shown) and a circumferential siding 21. Spring housing 18 encases said pulley 17 and a portion of said hollow member 13. The pulley 17 is rotatably secured to said plate 19 of said spring housing 18 by means of a pin 23. One end of said coil spring 15 extends through an opening 24 in said hollow member 13 through the interior of both hollow members 11 and 13 and is secured to an end plate 25 which is fixed to the upper end of the upper cylindrical member 11. As shown the end 15a of the spring 15 may be bolted to said plate 25 by means of bolt 27 and nut 29. The coiled spring 15 secures the upper member 11 to the lower member 13 under spring tension, whereby, unless secured to the mine roof or floor the members will telescope until, as described below, either the flanges 33 and 37 are in contact or a protuberance 41 engages the edge of slot 39.

The opposite end of bolt 27 which extends through plate 25 forms a hook 27a which is utilized for securing a steel cable to member 11. Hollow cylindrical member 13 (or lower cylindrical member) is also provided with an end plate 29 at its lower end to which a hook 31 is affixed in a manner similar to the above bolt 27. The end of cylindrical member 11 opposite plate 25 is provided with a flange 33 which is tapped to enable set screw 35 to be screwed therethrough to contact the outer surface of the lower cylindrical member.

Intermediate the end of the lower cylindrical member 13, a flange 37 is provided. The arrangement of said flanges 33 and 37 provide a stop action whereby the lower cylindrical member cannot pass completely into the interior of the upper cylindrical member. The primary purpose of the two flanges 33 and 37 is to provide a strong positive stop in case a person inadvertently lets go of the device when the spring is under tension. In this case the two cylinders might snap together and do damage to the instrument. The flanges also provide a rigid mounting platform for the reference lugs 34 and 36.

Upper cylindrical member 11 is provided with an axially extending slot 39 into which one or more protuberances 41, affixed to the outer surface of the lower cylindrical member, extend. This arrangement of the slot and the protuberance(s) also causes telescoping movement to be limited by said protuberance(s) engaging the top or the bottom of slot. This limiting telescoping motion is in addition to that provided in the flanges 33 and 37. The upper protuberance (41) is not strong enough to take a sudden snap closure of the two cylinders, so the larger flanges 33 and 37 are also required. The protuberance (41) also limits and minimizes the rotation of the upper cylinder 11 on the lower cylinder 13.

The changes in distance between flanges 33 and 37 or the protuberance(s) 41 and either end of said slot 39 may be measured to determine any change in the vertical distance between the roof and the floor of the mine. Generally the distance between lugs 34 and 36 is measured with a dial caliper or similar measuring device.

The extensometer of this invention may be installed in a mine as shown in the schematic portion of the FIGURE. An anchor bolt 101 or other means to secure a nonextendable cable is provided in the roof 103 and then directly therebelow a second anchor bolt 105 is provided in the floor 107 of the mine. Conveniently the extensometer 10 may be installed between rock pillars 113 and 115. Looped cables 109 and 111 i.e., steel cables having a loop on each end are secured to the anchor bolts and hooks 31 and 25. The cables are adjusted to provide a tension on spring 15 whereby at rest the upper and lower cylindrical members 11 and 13 are positioned somewhere between the vertical distance of travel between flanges 33 and 37 and a protuberance 41 and the uppermost or lower most edge of slot 39. The weight of the instrument along with spring tension, tensions the cable anchored to the mine roof. The spring tensions the cable anchored to the mine floor. The vertical distance between the flanges can be adjusted at the outset by utilizing set screw 35 to prevent telescoping motion between the upper and lower cylindrical members while adjusting the length of the floor or roof cable. Once in place the set screw 35 will be loosened to enable the cylindrical members to travel telescopically as the roof or floor of the mine moves vertically.

The initial distance between flanges 33 and 37 or other indicating marks (such as lugs 34 and 36) on the upper and lower cylindricals are measured. The change in such distance can be monitored over a period of time. It is known to those skilled in the art that when the rate of closure shows acceleration and/or the magnitude of closure is greater than a maximum value (each mine roof has its own characteristic value) safe working in the mine may be imperiled in view of an imminent failure of the roof.

The materials of construction of the extensometer of this invention are varied with the proviso that rigid materials be utilized since small changes in length of the hollow cylinders 11 and 13 are detrimental to accurate measurement of the vertical distance between the floor and roof of a mine. It is thus critical that all of the materials utilized in the construction of the extensometer of this invention be such that they will not elongate under tension along the vertical or corrode in the presence of acidic mine waters. Moreover, while the outside diameter of the lower member and the inside diameter of the upper member are such that the lower member can slide vertically within the upper member; the clearance between such members should not be enough to enable the lower member to move from the vertical and distort the measurement of the vertical travel. A suitable material for the constant tension coil spring 15 may be stainless steel.

Other suitable materials of construction for the extensometer of this invention are brass, aluminum etc.

The cables which are used to secure extensometer of this invention to the roof and the floor must be a nonextendible material whereby any movement recorded is due to the movement of the floor and/or the roof and not due to elongation or shrinkage of the cable. A high modulus material such as steel may be utilized.

The anchor bolts which are used to secure the cable to the roof and floor are well known in the art and need not be described further herein, however, a suitable anchor bolt is available from Wej-it Co.

While particular embodiments of the invention have been described it will be understood, of course, that the invention is not limited thereto since many obvious modifications can be made and it is intended to include within this invention any such modifications as will fall within the scope of the appended claims. For example, it will be appreciated by those skilled in the art that other means to secure the cable to extensometer of this invention may be utilized. That is, instead of a hook, the cable may be secured to the extensometer of the instant invention by a ring, snap latch etc. Furthermore, it is clear that flanges 33 and 37 can be eliminated and the vertical travel and telescoping movement between the upper and lower cylindrical members may be regulated by protuberances 41 and the length of slot 39. Spring 15 can be secured to the upper cylindrical member 11 at a point other than end plate 25.

Having now described the invention, I claim:

1. An extensometer for measuring changes in the vertical distance between the roof and floor of a mine opening which comprises a pair of rigid telescoping members, a tension spring securing said member to each other in a telescoping relationship, means for attaching a non-extendible cable to each of said members, and an indicator for determining telescopic movement of said members comprising a pair of lugs, each of said lugs being affixed to a separate flange.

2. The extensometer of claim 1 wherein said tension spring is a constant tension coiled spring.

3. The extensometer of claim 1 comprising a hook at each of the opposite ends of said rigid telescoping members.

4. The extensometer of claim 1 further comprising a flange secured to each of said rigid telescoping members to prevent one of said telescoping members from passing completely into the interior of the other.

5. The extensometer of claim 1 wherein the outer surface of inner telescoping member is provided with a protuberance and the outer telescoping member is provided with a corresponding axial slot to thereby limit the rotation of said telescoping members.

6. An extensometer for measuring changes in the vertical distance between the roof and the floor of a mine which comprises:
   (a) a first hollow cylindrical member having an axially extending slot spaced from the upper and lower end thereof, and a flange about the lower end thereof,
   (b) a second hollow cylindrical member telescopically inserted into said first member and having an end extending outwardly from said flange, said second member having a protuberance extending into said slot and an opening,
   (c) a housing attached to said second member and surrounding said opening,
   (d) a coiled spring assembly comprising a pulley which is rotatably secured to the inner wall of said housing and a constant tension coiled spring around said pulley and having a first end extending through said opening and secured under tension to said first member and a second end secured to said pulley,
   (e) means for securing said first hollow cylinder to the roof of said mine with the axis aligned with said vertical distance and
   (f) means for securing said second hollow cylinder to the floor of said mine.

7. An extensometer for measuring changes in the vertical distance between the roof and the floor of a mine which comprises:
   (a) a first hollow cylindrical member having an axially extending slot and a flange about one end;
   (b) a second hollow cylindrical member telescopically inserted into said first member and extending outwardly from the flanged end thereof, said second member having a protuberance extending into said slot and an opening,
   (c) a pulley rotably attached to said second member, and
   (d) a spring attached to and coiled about said pulley and having one end extending through said opening and secured under tension to said first member.

8. The extensometer of claim 7 wherein said spring is a constant tension spring.

9. The extensometer of claim 8 further comprising a hook at each of the opposite ends of said first and second members.

10. The extensometer of claim 9 further including a second flange affixed to said second member intermediate said opening and said inserted end to prevent said second member from passing completely into the interior of said first member.

11. The extensometer of claim 10 further including a housing about said spring and pulley.

* * * * *

UNITED STATES PATENT OFFICE
CERTIFICATE OF CORRECTION

Patent No. 4,514,905            Dated May 7, 1984

Inventor(s) William W. Lutzens

It is certified that error appears in the above-identified patent and that said Letters Patent are hereby corrected as shown below:

In column 5, line 20 "member" should be --members--.

Signed and Sealed this

Eighth Day of October 1985

[SEAL]

Attest:

DONALD J. QUIGG

Attesting Officer

*Commissioner of Patents and Trademarks—Designate*